United States Patent
Yates

(10) Patent No.: US 10,557,703 B2
(45) Date of Patent: Feb. 11, 2020

(54) DISTANCE MEASURING DEVICE AND METHOD FOR DETERMINING A DISTANCE

(71) Applicant: Rockwell Automation Limited, Buckinghamshire (GB)

(72) Inventor: Chris Yates, Edinburgh (GB)

(73) Assignee: Rockwell Automation Limited, Buckinghamshire (GB)

( * ) Notice: Subject to any disclaimer, the term of this patent is extended or adjusted under 35 U.S.C. 154(b) by 196 days.

(21) Appl. No.: 15/599,110

(22) Filed: May 18, 2017

(65) Prior Publication Data

US 2017/0307359 A1   Oct. 26, 2017

Related U.S. Application Data

(63) Continuation of application No. PCT/EP2015/076794, filed on Nov. 17, 2015.

(30) Foreign Application Priority Data

Nov. 21, 2014   (DE) .................. 10 2014 117 097

(51) Int. Cl.
*G01C 3/08* (2006.01)
*G01B 11/02* (2006.01)
(Continued)

(52) U.S. Cl.
CPC .......... *G01B 11/026* (2013.01); *G01S 17/105* (2013.01); *G01S 7/4818* (2013.01); *G01S 7/4866* (2013.01)

(58) Field of Classification Search
None
See application file for complete search history.

(56) References Cited

U.S. PATENT DOCUMENTS 6,373,557 B1   4/2002   Mengel et al.
6,647,205 B1   11/2003   Kindaichi et al.
(Continued)

FOREIGN PATENT DOCUMENTS

CN   1410826 A   4/2003
CN   1834687 A   9/2006
(Continued)

OTHER PUBLICATIONS

Office Action issued in European Patent Application No. EP 14801984.7, dated May 16, 2018 in English.
(Continued)

*Primary Examiner* — Isam A Alsomiri
*Assistant Examiner* — Amir J Askarian
(74) *Attorney, Agent, or Firm* — Amin, Turocy & Watson, LLP

(57) ABSTRACT

A distance measuring device and a method for determining a distance are provided. The method includes: illuminating an object with a sequence of the light pulses, capturing one arriving light pulse corresponding to an intensity $I_{e,l}$ within a first integration gate, and outputting a signal value $U_1$, capturing another arriving light pulse corresponding to the intensity $I_{e,l}$ within a second integration gate, and outputting a signal value $U_2$, capturing one arriving light pulse corresponding to an intensity $I_{e,h}$ within the first integration gate and outputting a signal value $U_3$, capturing the other arriving light pulse corresponding to the intensity $I_{e,h}$ within the second integration gate and outputting a signal value $U_4$, and calculating the distance between the distance measuring device and the object based on $U_1$, $U_2$, $U_3$, and $U_4$.

15 Claims, 2 Drawing Sheets

(51) Int. Cl.
  *G01S 17/10* (2006.01)
  *G01S 7/481* (2006.01)

(56) References Cited

U.S. PATENT DOCUMENTS

| | | | | |
|---|---|---|---|---|
| 7,212,278 | B2* | 5/2007 | Doemens | G01S 7/487 356/5.01 |
| 7,623,221 | B2 | 11/2009 | Thun et al. | |
| 8,699,008 | B2 | 4/2014 | Murakami et al. | |
| 9,395,440 | B2* | 7/2016 | Schrey | G01S 7/487 |
| 2003/0072051 | A1* | 4/2003 | Myers | H04J 14/002 398/43 |
| 2003/0193981 | A1* | 10/2003 | Matveev | G01S 7/51 372/69 |
| 2006/0214121 | A1 | 9/2006 | Schrey et al. | |
| 2008/0144000 | A1* | 6/2008 | Thun | G01S 7/487 356/5.05 |
| 2009/0135405 | A1* | 5/2009 | Fischer | G01S 7/487 356/5.03 |
| 2009/0323741 | A1* | 12/2009 | Deladurantaye | G06F 1/0321 372/25 |
| 2010/0303299 | A1* | 12/2010 | Cho | G01B 11/026 382/106 |
| 2012/0230673 | A1* | 9/2012 | Striegler | H04B 10/07951 398/16 |
| 2012/0249998 | A1* | 10/2012 | Eisele | G01C 3/08 356/5.01 |
| 2015/0234038 | A1 | 8/2015 | Yates et al. | |

FOREIGN PATENT DOCUMENTS

| | | |
|---|---|---|
| CN | 101114021 A | 1/2008 |
| CN | 202093171 U | 12/2011 |
| CN | 102378920 A | 3/2012 |
| CN | 102854510 A | 1/2013 |
| CN | 103605133 A | 2/2014 |
| DE | 19741887 A1 | 3/1999 |
| DE | 19833207 A1 | 2/2000 |
| DE | 10 2007 046 562 A1 | 4/2009 |
| DE | 102011081384 A1 | 2/2013 |
| EP | 1423731 B1 | 10/2006 |
| WO | 2014068061 A1 | 5/2014 |

OTHER PUBLICATIONS

International Search Report dated Feb. 12, 2016 of international application PCT/EP2015/076794 on which this application is based.
M. Nazarathy et al., "Real-Time Long Range Complementary Correlation Optical Time Domain Reflectometer," Journal of Lightwave Technology vol. 7(1): 24-38, Feb. 1989.
D. Huang et. al., "Research of Complementary Correlation Optical Time Domain Reflectometer," Journal of Universit of Electronic Science and Technology of China, Jun. 2005, vol. 34, No. 3 and English language Abstract thereof.

* cited by examiner

DISTANCE MEASURING DEVICE AND METHOD FOR DETERMINING A DISTANCE

CROSS REFERENCE TO RELATED APPLICATIONS

This application is a continuation application of international patent application PCT/EP2015/076794, filed Nov. 17, 2015, designating the United States and claiming priority from German application 10 2014 117 097.0, filed Nov. 21, 2014, and the entire content of both applications is incorporated herein by reference.

TECHNICAL FIELD

The invention relates to a distance measuring device and a method for determining a distance with the distance measuring device.

BACKGROUND

Distances can be measured between a measuring device and an object without a physical contact between the device and the object by optical methods. In these methods, the object is illuminated by a light source of the device and the light back reflected from the object is then captured by a light detector of the device.

Distances can for example be determined by periodically modulating the light intensity which is emitted from the light source and by measuring the phase difference between the emitted light and the back reflected light arriving on the detector. However, due to the periodicity of the light intensity, this method results in an ambiguous distance measurement. Distances can be unambiguously determined by measuring the time of flight between the emission of a light pulse and the arrival of a back reflected light pulse on the detector.

Ambient light, for example sun-light, can interfere with the distance measurement and therefore result in a reduction of the precision for the distance measurement. Conventionally, a background measurement is carried out without illuminating the object with the light pulse. The background measurement leads to an irregular operation of the light source. The irregular operation is disadvantageous because it results in a reduction of the life time of the light source and in fluctuations of the parameters of the light pulses, in particular intensity, pulse width, rise times and/or fall times. These fluctuations cause a reduction of the precision for the distance measurement.

SUMMARY

It is an object of the invention to provide a distance measuring device and a method for measuring a distance with the distance measuring device, wherein the distance can be measured with a high precision.

The distance measuring device according to an aspect of the invention includes a light source configured to illuminate an object with light pulses having a duration $T_p$, at least one photo element configured to capture the light pulses after being back reflected from the object, a trigger generator configured for controlling the emission of the light pulses and for activating the photo element during temporal integration gates, wherein the photo element is adapted to output a signal value U at the end of each integration gate with the signal value U being proportional to the energy of the light arriving on the photo element during its activation. The trigger generator stores a trigger scheme to control the emission of the light pulses such that a sequence of the light pulses including four consecutive light pulses consisting of two light pulses having an intensity $I_{e,l}$ and two light pulses having an intensity $T_{e,h}$ being higher than $I_{e,l}$ is emitted and that the repetition rate $1/\Delta_{rep}$ of the light pulses is constant, and to activate the photo element such that the delays between the integration gates and the emission start points in time of the four light pulses are such that the light pulses arriving on the photo element are captured such that one arriving light pulse corresponding to the intensity $I_{e,l}$ and one arriving light pulse corresponding to the intensity $I_{e,h}$ are captured by the photo element within first integration gates with an integration start point in time $T_{1,s}$ and an integration end point in time $T_{1,e}$ as well as the other arriving light pulse corresponding to the intensity $I_{e,l}$ and the other arriving light pulse corresponding to the intensity $I_{e,h}$ are captured by the photo element within second integration gates with an integration start point in time $T_{2,s}$ and an integration end point in time $T_{2,e}$, wherein the delay for the first integration gates is chosen such that either $T_{1,s}$ or $T_{1,e}$ is between $\Delta_{tof}$ and $\Delta_{tof}+T_p$ and the delay for the second integration gates is chosen such the respective light pulses are at least partially within the second integration gates, wherein $T_{1,s}$, $T_{1,e}$, $T_{2,s}$, $T_{2,e}$ are the delays from the emission start point in time and $\Delta_{tof}$ is the first point in time the arriving light pulses arrive on the photo element, and a processing unit adapted to calculate the distance between the distance measuring device and the object by using the difference of the signal values U being output at the end of the first integration gates and the difference of the signal values U being output at the end of the second integration gates. The duration $T_{1,e}-T_{1,s}$ of the first integration gates can be equal to or can be different from the duration $T_{2,e}-T_{2,s}$ of the second integration gates.

The method according to an aspect of the invention for determining a distance with the distance measuring device includes the steps of: a) illuminating the object with the sequence of the light pulses; b) capturing one arriving light pulse corresponding to the intensity $I_{e,l}$ within one of the first integration gates, and outputting a signal value $U_1$ at the end of the first integration gate; c) capturing the other arriving light pulse corresponding to the intensity $I_{e,l}$ within one of the second integration gates, and outputting a signal value $U_2$ at the end of the second integration gate; d) capturing one arriving light pulse corresponding to the intensity $I_{e,h}$ within the other first integration gate and outputting a signal value $U_3$ at the end of the first integration gate; e) capturing the other arriving light pulse corresponding to the intensity $I_{e,h}$ within the other second integration gate and outputting a signal value $U_4$ at the end of the second integration gate; f) calculating the distance between the distance measuring device and the object by using the difference of the signal values $U_2$ and $U_1$ and the difference of the signal values $U_4$ and $U_3$.

In order to arrange the integration gates with respect to the emission start point in time, a distance range in which the object can be located is predetermined. From the distance range $T_p$, $T_{1,s}$ and $T_{1,e}$ can be chosen such that $T_{1,s}$ or $T_{1,e}$ is between $\Delta_{tof}$ and $\Delta_{tof}+T_p$ for all possible distances of the distance range. $T_{2,s}$ and $T_{2,e}$ can then be chosen such that the respective light pulses are at least partially within the second integration gates for all possible distances of the distance range.

According to an aspect of the invention, $\Delta_{tof}$ and $\Delta_{tof}+T_p$ are between $T_{2,s}$ and $T_{2,e}$. For the case that $T_{1,s}$ is between $\Delta_{tof}$ and $\Delta_{tof}+T_p$, the time of flight $\Delta_{tof}$ from the emission of the light pulses to the arrival of the light pulses on the photo element is calculated by:

$$\Delta_{tof} = T_{1,s} + T_p\left(\frac{U_3 - U_1}{U_4 - U_2} - 1\right).\quad\text{(equation 1)}$$

For the case that $T_{1,e}$ is between $\Delta_{tof}$ and $\Delta_{tof}+T_p$, $\Delta_{tof}$ is calculated by:

$$\Delta_{tof} = T_{1,e} - T_p\frac{U_3 - U_1}{U_4 - U_2}.\quad\text{(equation 2)}$$

Also, according to the aspect of the invention, the durations of the first and second integration gates can be equal or can be different. If the durations are different, the duration $T_{2,e}-T_{2,s}$ can be longer than the duration $T_{1,e}-T_{1,s}$ to ensure that the complete light pulses are within the second integration gate.

Alternatively, according to another aspect of the invention, in case $T_{1,s}$ is between $\Delta_{tof}$ and $\Delta_{tof}+T_p$, $T_{2,s}$ is between $\Delta_{tof}$ and $\Delta_{tof}+T_p$, $T_{2,e}$ is later than $\Delta_{tof}+T_p$ and $T_{2,s}$ is different from $T_{1,s}$, and in the case $T_{1,e}$ is between $\Delta_{tof}$ and $\Delta_{tof}+T_p$, $T_{2,e}$ is between $\Delta_{tof}$ and $\Delta_{tof}+T_p$, $T_{2,s}$ is earlier than $\Delta_{tof}$ and $T_{2,e}$ is different from $T_{1,e}$.

For the case that $T_{1,e}$ is between $\Delta_{tof}$ and $\Delta_{tof}+T_p$, $\Delta_{tof}$ is calculated by $$\Delta_{tof} = T_{1,e} - (T_{2,e} - T_{1,e})\frac{U_2 - U_1}{(U_4 - U_3) - (U_2 - U_1)}.\quad\text{(equation 3)}$$

For the case that $T_{2,e}$ is between $\Delta_{tof}$ and $\Delta_{tof}+T_p$, $\Delta_{tof}$ is calculated by:

$$\Delta_{tof} = T_{1,s} - T_p - (T_{2,s} - T_{1,s})\frac{U_2 - U_1}{(U_4 - U_3) - (U_2 - U_1)}.\quad\text{(equation 4)}$$

For all cases, the distance r between the distance measuring device and the object is then calculated by $$r = 0.5 * c * \Delta_{tof}\quad\text{(equation 5)},$$

wherein c is the speed of light in the medium in which the distance measurement is carried out.

With the distance measuring device and the method according to an aspect of the invention, it is possible to eliminate the influence of background light, for example sun light, without taking a background measurement. The background measurement would include outputting a signal value U at the end of an integration gate without illuminating the object with a light pulse. Since it is not necessary to take the background measurement, it is possible to operate the light source with the constant repetition rate $1/\Delta_{rep}$, which results in a long life time of the light source. $\Delta_{rep}$ denotes the duration between two consecutive emission start points in time. Another advantage of the constant repetition rate is that the intensity fluctuations of the light pulses are reduced. Both, the elimination of the influence of the background light and the reduction of the intensity fluctuations result in a high precision for the distance measurement.

According to an aspect of the invention, the trigger scheme controls the emission of the sequence such that single light pulses having the intensity $I_{e,l}$ are emitted alternating with single light pulses having the intensity $I_{e,h}$. This results in a particular regular operation of the light source which results in a particular long life time of the light source and in particular small intensity fluctuations of the light pulses. According to an aspect of the invention, the trigger scheme controls the emission of the light pulses such that the sequence includes a dummy light pulse preceding the four light pulses. Since the dummy light pulse is not used for the distance measurement, it is advantageously achieved that only light pulses with small intensity fluctuations are used for the distance measurement. According to another aspect of the invention, the trigger scheme controls the emission of the light pulses such that the sequence includes a plurality of dummy light pulses, wherein at least one dummy light pulse precedes each of the four light pulses. By using the multitude of dummy light pulses, it is possible to maintain a stable and constant repetition rate $1/\Delta_{rep}$ and to carry out the measurements of the signal values U at a measurement frequency, even if the measurement frequency of the photo element is lower than repetition rate $1/\Delta_{rep}$ for a stable operation of the light source.

According to an aspect of the invention, the light source includes light emitting diodes, VCSELs (vertical-cavity surface-emitting laser) and lasers or any combination thereof that are in particular configured to emit in the visible and/or infrared spectral region. According to another aspect of the invention, the distance measuring device includes a CCD chip with an image intensifier and/or a CMOS chip that includes the at least one photo element.

According to a further aspect of the invention, the light source includes a first group with at least one light emitting diode, VCSEL and/or laser and a second group with at least one light emitting diode, VCSEL and/or laser, wherein the trigger scheme controls the emission of the light pulses such that the first group emits light pulses with the repetition rate $1/\Delta_{rep}$ and with the intensity $I_{e,l}$ and such that the second group emits light pulses with the repetition rate $0.5/\Delta_{rep}$ and with the intensity $I_{e,h}-I_{e,l}$ so that the overlap of the emission of the first group and second group results in the light pulses with the intensity $I_{e,h}$. Here, it is advantageously achieved that the first group and the second group are operated perfectly regularly so that the life times of the first group and the second group are particularly increased.

According to an aspect of the invention, $\Delta_{tof}$ and $\Delta_{tof}+T_p$ are between $T_{2,s}$ and $T_{2,e}$. Alternatively, according to another aspect of the invention, in case $T_{1,s}$ is between $\Delta_{tof}$ and $\Delta_{tof}+T_p$, $T_{2,s}$ is between $\Delta_{tof}$ and $\Delta_{tof}+T_p$, $T_{2,e}$ is later than $\Delta_{tof}+T_p$ and $T_{2,s}$ is different from $T_{1,s}$, and in case $T_{1,e}$ is between $\Delta_{tof}$ and $\Delta_{tof}+T_p$, $T_{2,e}$ is between $\Delta_{tof}$ and $\Delta_{tof}+T_p$, $T_{2,s}$ is earlier than $\Delta_{tof}$ and $T_{2,e}$ is different from $T_{1,e}$.

According to an aspect of the invention, in step a) the sequence is such that single light pulses having the intensity $I_{e,l}$ are emitted alternating with single light pulses having the intensity $I_{e,h}$. The sequence preferably includes a dummy light pulse preceding the four light pulses, wherein the dummy light pulse is not used for the determination of the distance. According to an aspect of the invention, the sequence includes a plurality of dummy light pulses, wherein at least one dummy light pulse precedes each of the four light pulses, wherein the dummy light pulses are not used for the determination of the distance. According to another aspect of the invention, in step a) the sequence includes a multitude of sets of the four light pulses and a respective distance is determined for each set by repeating steps b) to f).

BRIEF DESCRIPTION OF THE DRAWINGS

The invention will now be described with reference to the drawings wherein.

DESCRIPTION OF EXEMPLARY EMBODIMENTS

Figure 2:
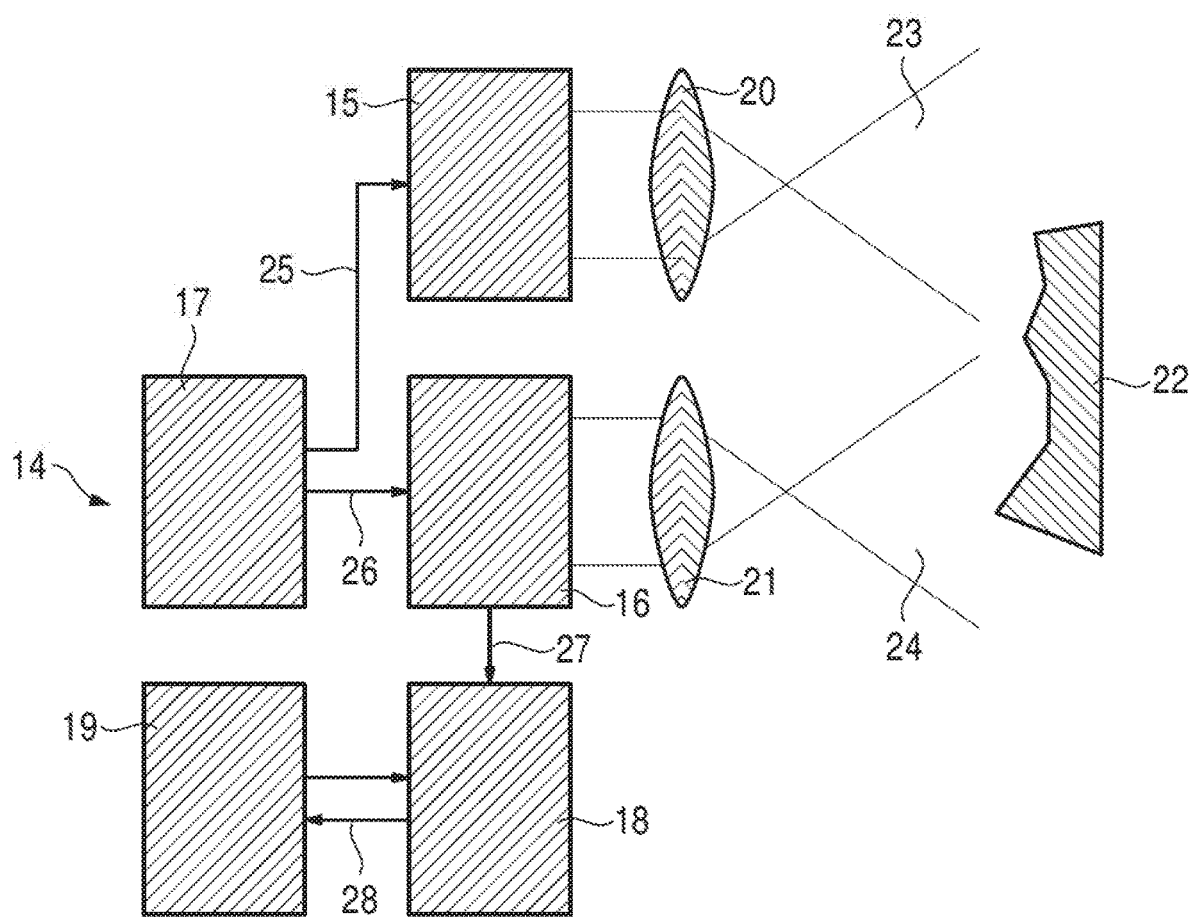
FIG. 2 shows a schematic cross section through a distance measuring device.

FIG. 2 shows a distance measuring device 14 including a light source 15, a photo element 16, a trigger generator 17, a memory unit 18 and a processing unit 19. The light source 15 includes light emitting diodes, VCSEL (vertical-cavity surface-emitting laser) and/or lasers, wherein the light emitting diodes, the VCSELs and/or the lasers are configured to emit in the visible and/or infrared spectral region. The distance measuring device 14 includes a CCD chip with an image intensifier and/or a CMOS chip that includes the at least one photo element 16. The CMOS chip includes at least one condenser that can be discharged via a photodiode. The trigger generator 17 provides an activation signal 25 for controlling the emission of the light source 15 and an activation signal 26 for activating the photo element 16 during a temporal integration gate 6. The CCD chip is activated by switching on the image intensifier and the CMOS chip is activated by closing a switch in the circuit of the condenser and the photodiode, which allows that the condenser is discharged via the photodiode. The photo element 16 is configured to output a signal value U at the end of the integration gate 6, wherein the signal value U is proportional to the energy of the light arriving on the photo element during its activation. The signal value U is read out in a readout operation 27 and stored in the memory unit 18. The memory unit 18 is configured to store a multitude of signal values U. The multitude of the signal values U is then processed by the processing unit 19 in a processing operation 28 in order to determine a distance between the distance measuring device 14 and an object 22.

The signal value U can be measured directly, for example if a CCD chip or CMOS image sensor is used. The charge measured at the end of the integration gate is proportional to the energy of the light arriving on the photo element during its activation and therefore the signal value U, which is proportional to the charge, is proportional to the energy of the light. On the other hand, the signal value U can be determined indirectly if the relation between a measured value and the energy of the light arriving on the photo element during its activation is known. For example, if the photo element includes a condenser that is discharged via a photodiode during the activation of the photo element, the measured value is a voltage that is approximately inversely proportional to the energy of the light arriving on the photo element during its activation.

Detection optics 21 are arranged in front of the photo element 16 in order to image a field of view 24 onto the photo element 16. Illumination optics 20 are arranged in front of the light source 15 in order to shape the light emitted by the light source 15 such that an illumination area 23 can be illuminated by the light source 15. The illumination area 23 and the field of view 24 are shaped such that the field of view 24 is substantially completely covered by the illumination area 23. The distance measuring device 14 is adapted such that the light emitted by the light source 15 impinges onto the object 22 located within the field of view 24, and arrives on the photo element 16 after being back reflected from the object 22. The illumination optics 20 and the detection optics 21 are preferably respective lenses. It is also possible to use a single lens for both the illumination optics 20 and the detection optics 21.

Figure 1:
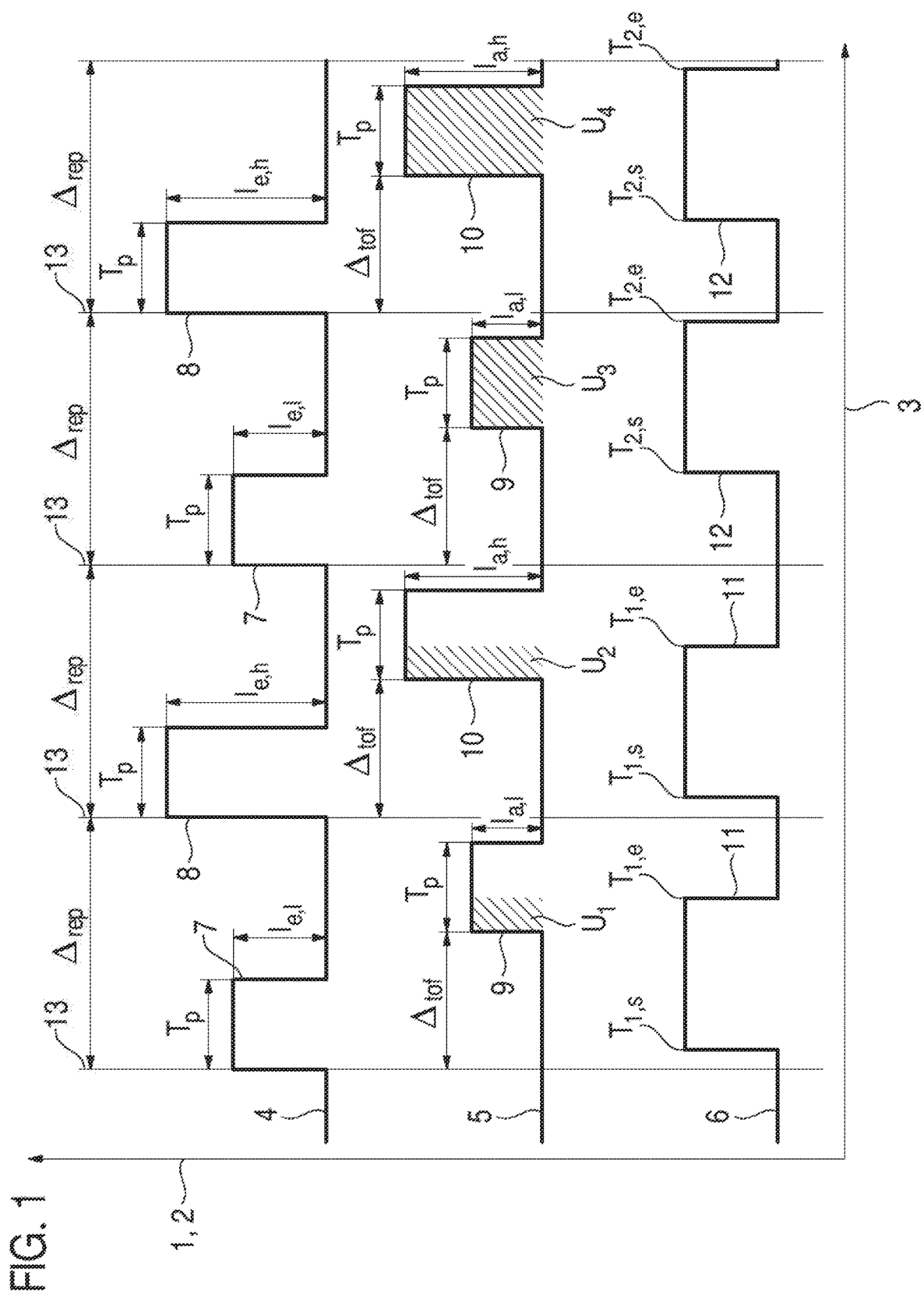
FIG. 1 shows temporal profile diagrams with integration gates and intensities of light pulses.

In FIG. 1, three temporal profile diagrams are shown, wherein an intensity 1 and an integration gate 2 are plotted versus time 3. The first temporal profile diagram is a plot of the intensity 4 of the emitted light pulses 7, 8 versus the time 3, the second temporal profile diagram is a plot of the intensity 5 of the light pulses 9, 10 arriving on the photo element 16 after being back reflected from the object 22 versus the time 3, and the third temporal profile diagram is a plot of the integration gates 6 versus the time 3.

The first temporal profile diagram shows that the light source 15 emits a sequence of consecutive light pulses 7, 8. The light pulses 7, 8 have a preferably rectangular temporal profile so that the light source 15 switches the intensity of the light pulses 7, 8 at an emission start point in time 13 from a lower intensity to a higher intensity and after a pulse duration $T_p$ from the emission start point in time 13 back to the lower intensity. The pulse duration $T_p$ is preferably the same for all the light pulses 7, 8 and is in the order of picoseconds or nanoseconds. The repetition rate $1/\Delta_{rep}$ for all the light pulses in the sequence is constant, wherein $\Delta_{rep}$ is the duration between two consecutive emission start points in time 13. The repetition rate $1/\Delta_{rep}$ for the light pulses 7, 8 is from 1 Hz to 20 kHz.

In the following it is assumed that the lower intensity is zero. The sequence includes a set of four consecutive light pulses 7, 8, wherein two light pulses 7 of the four light pulses 7, 8 have the intensity $I_{e,l}$ and the other two light pulses 8 the four light pulses 7, 8 have the intensity $I_{e,h}$, wherein $I_{e,h} > I_{e,l}$. In the sequence, a single light pulse 7 with the intensity $I_{e,l}$ and a single light pulse 8 with the intensity $I_{e,h}$ are always emitted alternatingly. After the emission, the light pulses 7, 8 impinge on the object 22 located within the field of view 24 and are back reflected from the object 22. Afterwards the light pulses 9, 10 arrive on the photo element 16, wherein $\Delta_{tof}$ is the first point in time from the emission start point in time 13, when the light pulses 9, 10 arrive on the photo element 16. The two light pulses 9 arriving on the photo element 16 and corresponding to the light pulses 7 with the intensity $I_{e,l}$ have the intensity $I_{a,l}$, wherein $I_{a,l} < I_{e,l}$. The two light pulses 10 arriving on the photo element 16 and corresponding to the light pulses 8 with the intensity $I_{e,h}$ have the intensity $I_{a,h}$, wherein $I_{a,h} < I_{e,h}$.

The third temporal profile diagram shows that the set of the four light pulses 9, 10 arriving on the photo element 16 are captured within two first integration gates 11 and two second integration gates 12. The first integration gates 11 have an integration start point in time $T_{1,s}$ and an end integration end point in time $T_{1,e}$, wherein $T_{1,s}$ and $T_{1,e}$ are the delays from the emission start point in time 13. The second integration gates 12 have an integration start point in time $T_{2,s}$ and an integration end point in time $T_{2,e}$, wherein $T_{2,s}$ and $T_{2,e}$ are the delays from the emission start point in time 13. One of the four light pulses 9 having the intensity $I_{a,l}$ and one of the four light pulses 10 having the intensity $I_{a,h}$ are captured by the photo element 16 within a respective first integration gate 11 such that $T_{1,e}$ is between $\Delta_{tof}$ and $\Delta_{tof}+T_p$ and that $T_{1,s}$ is earlier than $\Delta_{tof}$. Alternatively, it is possible that the respective first integration gate 11 is such that $T_{1,s}$ is between $\Delta_{tof}$ and $\Delta_{tof}+T_p$ and that $T_{1,e}$ is later than $\Delta_{tof}+T_p$. The other of the four light pulses 9 having the intensity $I_{a,l}$ and the other of the four light pulses 10 having the intensity $I_{a,h}$ are captured by the photo element 16 within a respective second integration gate 12 such that $\Delta_{tof}$ and $\Delta_{tof}+T_p$ are between $T_{2,s}$ and $T_{2,e}$.

The hatched areas in the second temporal profile diagram are proportional to the energy of the light arriving on the photo element 16 during its activation. Since the signal value U is proportional to the energy of light arriving on the photo element during its activation, the signal value U is also proportional to the hatched areas. A signal value $U_1$ is put out at the end of the first integration gate 11 that captures one of the light pulses 9 with the intensity $I_{a,l}$. A signal value $U_3$ is output at the end of the first integration gate 11 that captures one of the light pulses 10 with the intensity $I_{a,h}$. A signal value $U_2$ is put out at the end of the second integration gate 12 that captures the other of the light pulses 9 with the intensity $I_{a,l}$. A signal value $U_4$ is put out at the end of the second integration gate 12 that captures the other of the light pulses 10 with the intensity $I_{a,h}$.

FIG. 1 shows that $\Delta_{tof}+U_1/I_{a,l}=T_{1,e}$ and $\Delta_{tof}+U_3/I_{a,h}=T_{1,e}$. These two equations are equivalent to:

$$I_{a,l} = \frac{U_1}{T_{1,e} - \Delta_{tof}} \quad \text{(equation 6)}$$

and $$I_{a,h} = \frac{U_3}{T_{1,e} - \Delta_{tof}}. \quad \text{(equation 7)}$$

Furthermore, FIG. 1 shows that $U_2=T_p*I_{a,l}$ and $U_4=T_p*I_{a,h}$. These two equations are equivalent to:

$$I_{a,l} = \frac{U_2}{T_p} \quad \text{(equation 8)}$$

and $$I_{a,h} = \frac{U_4}{T_p}. \quad \text{(equation 9)}$$

By subtracting equation 6 from equation 7 and equation 8 from equation 9 it follows:

$$I_{a,h} - I_{a,l} = \frac{1}{T_{1,e} - \Delta_{tof}}(U_3 - U_1) \quad \text{(equation 10)}$$

and $$I_{a,h} - I_{a,l} = \frac{1}{T_p}(U_4 - U_2). \quad \text{(equation 11)}$$

By equalizing the right hand sides of equation 10 and equation 11, it is then possible to derive equation 2. Equation 3 can be derived in an analogous manner. By subtracting the equations 6 to 9, the influence of background light is eliminated.

The sequence can include a dummy light pulse preceding the set of the four light pulses 7, 8, wherein the dummy light pulse is not used for the determination of a distance. In this case, the dummy light pulse has an emission start point in time that is a duration $\Delta_{rep}$ earlier than the emission start point in time 13 of the earliest of the four light pulses 7, 8.

The sequence can also include a multitude of dummy pulses preceding each of the four light pulses 7, 8 wherein the dummy light pulses are not used for the determination of a distance. In these cases, the dummy light pulses have emission start points in time that are earlier than the emission start point of the respective measurement light pulse 7, 8.

Furthermore, the sequence can include a multitude of the sets of the four light pulses 7, 8 and a respective distance is calculated for each of the sets. If the sequence includes the multitude of the sets, the repetition rate of all the light pulses is maintained constant with the repetition rate $1/\Delta_{rep}$. The distance measuring device 14 can include a plurality of photo elements 16 and a respective distance is determined for each of the photo elements 16.

In an exemplary embodiment, the light source includes a first group with at least one light emitting diode, VCSEL and/or laser and a second group with at least one light emitting diode, VCSEL and/or laser, wherein the emission of the light pulses is controlled such that the first group emits light pulses with the repetition rate $1/\Delta_{rep}$ and with the intensity $I_{e,l}$ and such that the second group emits light pulses with the repetition rate $0.5/\Delta_{rep}$ and with the intensity $I_{e,h}-I_{e,l}$ so that the overlap of the emission of the first group and second group results in the light pulses with the intensity $I_{e,h}$.

It is understood that the foregoing description is that of the exemplary embodiments of the invention and that various changes and modifications may be made thereto without departing from the spirit and scope of the invention as defined in the appended claims.

LIST OF REFERENCE NUMERALS

1 intensity
2 integration gate
3 time
4 intensity of emitted light pulses
5 intensity of arriving light pulses
6 integration gates
7 emitted light pulse with low intensity
8 emitted light pulse with high intensity
9 arriving light pulse with low intensity
10 arriving light pulse with high intensity
11 first integration gate
12 second integration gate
13 emission start point in time
14 distance measuring device
15 light source
16 photo element
17 trigger generator
18 memory unit
19 processing unit
20 illumination optics
21 detection optics
22 object
23 illumination area
24 field of view
25 activation signal for light source
26 activation signal for photo element
27 readout operation
28 processing operation
$\Delta_{rep}$ repetition duration
$T_p$ pulse duration
$\Delta_{tof}$ time of flight
$T_{1,s}$ integration start point in time of first integration gate
$T_{1,e}$ integration end point in time of first integration gate
$T_{2,s}$ integration start point in time of second integration gate
$T_{2,e}$ integration end point in time of second integration gate
$I_{e,l}$ intensity of emitted light pulse
$I_{e,h}$ intensity of emitted light pulse
$I_{a,l}$ intensity of arriving light pulse
$I_{a,h}$ intensity of arriving light pulse

What is claimed is:

1. A distance measuring device comprising:
a light source configured to illuminate an object with emitted light pulses;
at least one photo element configured to capture arriving light pulses comprising a subset of the emitted light pulses back reflected from the object;
a trigger generator configured to control an emission of the emitted light pulses and activate the at least one photo element during integration gates, the integration gates comprising two first integration gates and two second integration gates, wherein
the at least one photo element is configured to output a signal value (U) at an end of respective integration gates of the integration gates, the signal value U being proportional to an energy of light arriving on the at least one photo element during a duration in which the at least one photo element is activated,
the trigger generator is configured to control the emission of the emitted light pulses such that a sequence of the emitted light pulses having a constant pulse duration ($T_p$) is emitted and a repetition rate of the emitted light pulses is constant,
the sequence of the emitted light pulses comprises four consecutively emitted light pulses that alternate in intensity between a first intensity ($I_{e,l}$) and a second intensity ($I_{e,h}$) that is greater than the first intensity ($I_{e,l}$) to yield a first emitted light pulse having the first intensity ($I_{e,l}$), a second emitted light pulse having the second intensity ($I_{e,h}$), a third emitted light pulse having the first intensity ($I_{e,l}$) and a fourth emitted light pulse having the second intensity ($I_{e,h}$),
the trigger generator is configured to activate the at least one photo element such that a first arriving light pulse corresponding to the first emitted light pulse and a second arriving light pulse corresponding to the second emitted light pulse are captured by the at least one photo element within the two first integration gates, respectively, and a third arriving light pulse corresponding to the third emitted light pulse and a fourth arriving light pulse corresponding to the fourth emitted light pulse are captured by the at least one photo element within the two second integration gates, respectively,
first start times of the two first integration gates are delayed relative to first emission start times of the first and second emitted light pulses, respectively, by a first delay time ($T_{1,s}$),
second start times of the two second integration gates are delayed relative to second emission start times of the third and fourth emitted light pulses, respectively, by a second delay time ($T_{2,s}$), wherein the second delay time ($T_{2,s}$) is longer than the first delay time ($T_{1,s}$); and
a processing unit configured to calculate a distance between the distance measuring device and the object based on a first difference of signal values (U) outputted at ends of the two first integration gates and a second difference of the signal values (U) outputted at ends of the two second integration gates.

2. The distance measuring device of claim 1, wherein the trigger generator controls the emission of the emitted light pulses such that an entirety of the third arriving light pulse is received at the at least one photo element while a first of the two second integration gates is active and an entirety of the fourth arriving light pulse is received at the at least one photo element while a second of the two second integration gates is active.

3. The distance measuring device of claim 1, wherein the trigger generator controls the emission of the emitted light pulses such that, for distances within a distance measuring range of the distance measuring device:
the first start times or end times of the two first integration gates occur while the first and second arriving light pulses, respectively, are being received by the at least one photo element, and
second start times of the two second integration gates occur such that the third and fourth arriving light pulses are at least partially within the two second integration gates, respectively.

4. The distance measuring device of claim 1, wherein:
the trigger generator controls the emission of the emitted light pulses such that the sequence includes a dummy light pulse preceding the four consecutively emitted light pulses.

5. The distance measuring device of claim 1, wherein the light source comprises at least one of light emitting diodes, vertical-cavity surface-emitting lasers (VCSELs), or lasers that are configured to emit light in at least one of a visible spectral region or an infrared spectral region.

6. The distance measuring device of claim 1, wherein the at least one photo element is embodied on at least one of
a charge-coupled device (CCD) chip with an image intensifier, or
a complementary metal-oxide-semiconductor (CMOS) chip.

7. The distance measuring device of claim 1, wherein a first duration of the two first integration gates is different than a second duration of the two second integration gates.

8. A method for determining a distance by a distance measuring device the method comprising:
illuminating an object with a sequence of emitted light pulses having a constant pulse duration, wherein the illuminating comprises emitting consecutive light pulses that alternate in intensity between a first intensity ($I_{e,l}$) and a second intensity ($I_{e,h}$) that is greater than the first intensity ($I_{e,l}$) to yield a first emitted light pulse having the first intensity ($I_{e,l}$), a second emitted light pulse having the second intensity ($I_{e,h}$), a third emitted light pulse having the first intensity ($I_{e,l}$), and a fourth emitted light pulse having the second intensity ($I_{e,h}$);
capturing a first arriving light pulse corresponding to the first emitted light pulse within a first of two first integration gates, and outputting a first signal value ($U_1$) at an end of the first of the two first integration gates, the signal value ($U_1$) being proportional to a first energy of light arriving on a photo element while the first of the two first integration gates is active;
capturing a second arriving light pulse corresponding to the third emitted light pulse within a first of two second integration gates, and outputting a second signal value ($U_2$) at an end of the first of the two second integration gates, the signal value ($U_2$) being proportional to a second energy of light arriving on the photo element while the first of the two second integration gates is active;
capturing a third arriving light pulse corresponding to the second emitted light pulse within a second of the two first integration gates and outputting a third signal value ($U_3$) at an end of the second of the two first integration gates, the signal value ($U_3$) being proportional to a third energy of light arriving on the photo element while the second of the two first integration gates is active;

capturing a fourth arriving light pulse corresponding to the fourth emitted light pulse within a second of the two second integration gates and outputting a fourth signal value ($U_4$) at an end of the second of the two second integration gates, the signal value ($U_4$) being proportional to a fourth energy of light arriving on the photo element while the second of the two second integration gates is active; and calculating the distance between the distance measuring device and the object based on a first difference between the second signal value ($U_2$) and the first signal value ($U_1$) and a second difference between the fourth signal value ($U_4$) and the third signal value $U_3$), wherein first start times of the two first integration gates are delayed relative to first emission start times of the first and third emitted light pulses, respectively, by a first delay time ($T_{1,s}$), and second start times of the two second integration gates are delayed relative to second emission start times of the second and fourth emitted light pulses, respectively, by a second delay time ($T_{2,s}$), and the second delay time ($T_{2,s}$) is longer than the first delay time ($T_{1,s}$).

9. The method of claim 8, wherein the capturing the second arriving light pulse and the capturing the fourth arriving light pulse comprise controlling timings of the two second integration gates such that entireties of the second arriving light pulse and the fourth arriving light pulse are received while the two second integration gates, respectively, are active.

10. The method of claim 8, wherein the capturing the first, second, third, and fourth arriving light pulses comprises controlling timings of the two first integration gates and the two second integration gates such that:

the first start times or end times of the two first integration gates occur while the first and third arriving light pulses, respectively, are being received by the at least one photo element, and second start times of the two second integration gates occur such that the second and fourth arriving light pulses are at least partially within the two second integration gates, respectively.

11. The method of claim 8, wherein the illuminating comprises emitting the sequence of the emitted light pulses to include a dummy light pulse preceding the sequence of the emitted light pulses, and the dummy light pulses is not used for the calculating of the distance.

12. The method of claim 8, further comprising emitting a plurality of sets of the first, second, third, and fourth emitted light pulses and determining respective distances for the plurality of sets.

13. The method of claim 8, wherein the illuminating comprises:

illuminating the object using a light source that includes a first group comprising at least one of a light emitting diode, a vertical-cavity surface-emitting laser (VCSEL), or a laser, and a second group comprising at least one of the light emitting diode, the VCSEL, or the laser.

14. The method of claim 8, wherein the capturing the first arriving light pulse, the capturing the second arriving light pulse, the capturing the third arriving light pulse, and the capturing the fourth arriving light pulse comprise setting a first duration of the two first integration gates to be different than a second duration of the two second integration gates.

15. The method of claim 8, wherein the photo element is embodied on at least one of a charge-coupled device (CCD) chip with an image intensifier, or a complementary metal-oxide-semiconductor (CMOS) chip.

\* \* \* \* \*